United States Patent
Popp et al.

(10) Patent No.: US 10,661,979 B2
(45) Date of Patent: May 26, 2020

(54) METHOD FOR PRODUCTION OF A TUBULAR BODY

(71) Applicant: FKM Walzentechnik Dr. Freudenberg GmbH, Duisburg (DE)

(72) Inventors: Eckhard Popp, Buchholz I.D. Nordheide (DE); Jan Malluche, Mülheim a.d. Ruhr (DE); Ulrich Freudenberg, Mülheim a.d. Ruhr (DE)

(73) Assignee: FKM Walzentechnik Dr. Freudenberg GmbH, Duisburg (DE)

( * ) Notice: Subject to any disclaimer, the term of this patent is extended or adjusted under 35 U.S.C. 154(b) by 495 days.

(21) Appl. No.: 15/475,165

(22) Filed: Mar. 31, 2017

(65) Prior Publication Data

US 2017/0283161 A1 Oct. 5, 2017

(30) Foreign Application Priority Data

Mar. 31, 2016 (DE) .......................... 10 2016 003 736

(51) Int. Cl.
*B65D 85/00* (2006.01)
*B32B 37/22* (2006.01)
(Continued)

(52) U.S. Cl.
CPC ............ *B65D 85/70* (2013.01); *B29C 41/003* (2013.01); *B29C 41/085* (2013.01); *B29C 41/22* (2013.01);
(Continued)

(58) Field of Classification Search
CPC ........ B65D 85/70; B65D 45/00; B29C 41/32; B29C 41/36; B29C 41/003; B29C 41/085;
(Continued)

(56) References Cited

U.S. PATENT DOCUMENTS 3,052,927 A * 9/1962 Weinbrenner ........ B29C 44/445
264/45.7
3,150,219 A * 9/1964 Schmidt .................. F16L 9/128
264/258
(Continued)

FOREIGN PATENT DOCUMENTS

DE 1475569 A 1/1969
DE 3536483 A1 4/1987
JP 2003080608 A * 3/2003

*Primary Examiner* — Philip C Tucker
*Assistant Examiner* — Vicki Wu
(74) *Attorney, Agent, or Firm* — Michael Soderman

(57) ABSTRACT

A method for production of a tubular body applying the following steps:
Pressureless application of at least one first curable plastic layer made of reactive polyurethane materials with a core via a rotational molding process,
Curing the at least one plastic layer,
Winding at least one reinforcement layer onto the at least one first plastic layer,
Pressureless application of at least one second curable plastic layer, wherein the reinforcement layer is embedded without holes between the two plastic layers, and
Removal of the core after completion of the body.
Because of this, the position of the reinforcement layer 7 can be individually established and it can be ensured that the reinforcement layer will not penetrate into the first plastic layer during winding after the curing of the first plastic layer.

17 Claims, 8 Drawing Sheets

(51) Int. Cl.
| | |
|---|---|
| B29C 41/00 | (2006.01) |
| B29C 41/22 | (2006.01) |
| B29D 23/00 | (2006.01) |
| B65D 45/16 | (2006.01) |
| B32B 27/40 | (2006.01) |
| B32B 27/38 | (2006.01) |
| B32B 5/02 | (2006.01) |
| B32B 3/08 | (2006.01) |
| B32B 27/12 | (2006.01) |
| B29C 41/08 | (2006.01) |
| B32B 1/08 | (2006.01) |
| B29C 41/32 | (2006.01) |
| F16L 11/112 | (2006.01) |
| B29C 41/36 | (2006.01) |
| B29K 63/00 | (2006.01) |
| B29K 75/00 | (2006.01) |
| B29K 309/08 | (2006.01) |
| B29L 31/00 | (2006.01) |

(52) U.S. Cl.
CPC ............ *B29C 41/32* (2013.01); *B29C 41/36* (2013.01); *B29D 23/00* (2013.01); *B32B 1/08* (2013.01); *B32B 3/08* (2013.01); *B32B 5/02* (2013.01); *B32B 27/12* (2013.01); *B32B 27/38* (2013.01); *B32B 27/40* (2013.01); *B32B 37/22* (2013.01); *B65D 45/16* (2013.01); *F16L 11/112* (2013.01); *B29K 2063/00* (2013.01); *B29K 2075/00* (2013.01); *B29K 2309/08* (2013.01); *B29K 2313/00* (2013.01); *B29K 2995/0087* (2013.01); *B29L 2031/712* (2013.01); *B32B 2262/101* (2013.01); *B32B 2307/584* (2013.01); *B32B 2315/085* (2013.01); *B32B 2363/00* (2013.01); *B32B 2375/00* (2013.01); *B32B 2439/00* (2013.01)

(58) Field of Classification Search
CPC .......... B29C 41/22; F16L 11/112; B32B 1/08; B32B 3/08; B32B 5/02; B32B 27/12; B32B 27/38; B32B 27/40; B32B 37/22; B32B 2262/101; B32B 2307/584; B32B 15/085; B32B 2363/00; B32B 2375/00; B32B 2439/00; B29K 2063/00; B29K 2075/00; B29K 2309/08; B29K 2313/00; B29K 2995/0087; B29L 2031/712; B29D 23/00
USPC ........................................ 156/242
See application file for complete search history.

(56) References Cited

U.S. PATENT DOCUMENTS

| | | | |
|---|---|---|---|
| 4,071,599 A * | 1/1978 | Walker | B29C 70/326 264/257 |
| 4,097,572 A * | 6/1978 | Walker | B29C 33/68 264/310 |
| 5,259,901 A | 11/1993 | Davis et al. | |
| 2005/0129921 A1* | 6/2005 | Laws | A23G 3/0029 428/304.4 |
| 2009/0236349 A1* | 9/2009 | Mueller | F17C 1/06 220/590 |
| 2012/0066994 A1* | 3/2012 | Gibson | B29C 70/526 52/309.13 |

* cited by examiner

A-A

METHOD FOR PRODUCTION OF A TUBULAR BODY

CROSS REFERENCE TO RELATED APPLICATIONS

This application claims the priority of DE 102016003736.9 filed on 2016 Mar. 31; this application is incorporated by reference herein in its entirety.

BACKGROUND

The invention relates to a method for production of a tubular body, in particular a tube for transporting abrasive materials.

Tubular bodies are essentially required to transport partially solid and liquid materials; the tubular bodies are designed in the form of rotationally symmetric tubes and are subject to increased stresses caused by the materials to be transported. Abrasive materials are frequently transported, for instance water with solid components; they can have sharp edges in individual cases. Rubber tubes are customarily used for the transport that are reinforced if applicable with a textile so that corresponding compression forces of more than 120 bar can be accommodated. The service lives of rubber tubes of this type are very limited, so there is a desire to use other materials.

The published application DE 34 21 364 A1 discloses a method for producing oblong, hollow bodies, especially tubes, using a rotating core. Four roller brackets are allocated to the core from which overlapping webs of a separating film are unwound from supply rollers, and a liquid material, a reaction mixture or a melt is applied to the separating film via several feeder heads. The liquid material is applied here while a textile web that serves as a reinforcement material is simultaneously worked in.

Further methods for producing tubular bodies are known from EP 0 036 184 A1 and EP 0 184 759 A1; a reaction is brought about between at least two liquid or pasty components via a feeder head, and there are provisions for a simultaneous addition of a thread as a reinforcement material.

The methods known in the prior art have the drawback in connection with this that the elastomer materials are directly wrapped with a reinforcement layer in the form of a thread or a textile, and this thread permeates the pasty, elastomer materials and penetrates right down to the lowermost layers close to the core. The reinforcement material is consequently not located in the central area of the tubular body to be produced, but instead is concentrated in the direct proximity of the inner diameter. Strength that is desired over the entire cross section is therefore not ensured when there is a commensurate wall thickness of the outer layers of the rotationally symmetric body.

SUMMARY

The invention relates to a method for production of a tubular body 4, in particular a tube for transporting abrasive materials. To obtain greater strength of the tubular body 4 and to optimize the production process, it is envisaged in accordance with the invention that the following method steps will be applied to manufacture the tubular body 4:

Pressureless application of at least one first curable plastic layer (5, 26, 42) made of reactive polyurethane materials with a core via a rotational molding process,
Curing the at least one plastic layer (5, 26, 42),
Winding at least one reinforcement layer (7, 28, 44) onto the at least one first plastic layer (5, 26, 42),
Pressureless application of at least one second curable plastic layer (6, 27, 43), wherein the reinforcement layer is embedded without holes between the two plastic layers (6, 27, 43), and
Removal of the core after completion of the body (4, 40).

Because of this, the special advantage is brought about that the position of the reinforcement layer 7 can be individually established and it can be ensured that the reinforcement layer will not penetrate into the first plastic layer 5 during winding after the curing of the first plastic layer 5.

DETAILED DESCRIPTION

The instant invention is therefore based on the objective of presenting an improved method for producing a rotationally symmetric body and for realizing the possibility of a determination of the positions of the reinforcement materials within the wall range.

The problem is solved as per the invention with at least the following method steps:

Pressureless application of at least one first curable plastic layer (5, 26, 42) made of reactive polyurethane materials with a core via a rotational molding process,
Curing the at least one plastic layer (5, 26, 42),
Winding at least one reinforcement layer (7, 28, 44) onto the at least one first plastic layer (5, 26, 42),
Pressureless application of at least one second curable plastic layer (6, 27, 43), wherein the reinforcement layer is embedded without holes between the two plastic layers (6, 27, 43), and
Removal of the core after completion of the body (4, 40).

Further advantageous forms of the method can be found in the sub-claims.

The special advantage of the instant invention is that a first curable plastic layer can be applied to a core, which can be adapted in terms of the layer thickness to the requirements that are placed on it, and the curing of the plastic layer can be put off at first until a reinforcement layer can be wound on, preferably crosswise. In a third work step, at least one second curable plastic layer, whose layer thickness is likewise in line with the requirements, is applied to the first curable plastic layer with the reinforcement layer. After the tubular body is cured, the core is removed and can be used again. Both the first and the second plastic layers can be applied in accordance with the desired layer thickness in connection with this, in one work step or if necessary also in two work steps, and the possibility further exists for a reinforcement layer to be wound onto a first plastic layer to start with, a second curable plastic layer is applied after that and, if necessary, at least a further reinforcement layer is wound on, which is subsequently covered once again with a plastic layer. The requirements that are placed on this by the desired elasticity and the tensile forces to be absorbed can be individually addressed here by embedding one or two radially spaced reinforcement layers; the reinforcement layers can be wound on crosswise in each case. Plastic layers and reinforcement layers are preferably applied, or wound onto, a rotating core. If only one inner plastic layer and one outer plastic layer are applied, the outer plastic layer will simultaneously serve as a protective layer. An additional protective layer could also be applied independently of that, though.

The plastic layer is comprised of a reactive polyurethane material, which is applied to the core or the lower-lying layers of reinforcement layers or plastic layers for curing. As a rule, the polyurethane material is comprised of at least two components that are mixed via a corresponding device with outlet openings and applied with the aid of an outlet nozzle and a feeder head to the core or, as the case may be, the layers that have already been completed. The fully complete reaction of the reaction mixture to form a solid chemical compound takes place very quickly and can be influenced by the addition of reaction agents, so the reaction time can be set within a broad range.

The polyurethane material is made up of a reaction product of an isocyanate component and a resin mixture component. The isocyanate component can be aromatic or aliphatic; the isocyanate component can involve a monomer, a polymer or a variant reaction of isocyanates, a quasi prepolymer or a prepolymer. The resin mixture can be comprised of polymer resins that are terminated by amino groups or hydroxyl groups and/or chain extending agents that are terminated by amino groups or hydroxyl groups. The components of the polymer resins that are terminated by amino groups do not have any hydroxyl portions.

A multitude of substances are consequently available for the different components of the polyurethane material. It is important for the reaction product to have elastic and abrasion-proof characteristics. The plastic layer is appropriately made of a polyurethane for that reason. As a special preference, the plastic layer is comprised of a 2 k or multi-component polyurethane system in connection with this. Because of the use of polyurethane materials, a substantially longer service life of the tubes can be obtained here with respect to customary vulcanized rubber tubes.

The two components that make up the plastic layers are applied in a rotational molding process to the intended surface shortly before curing so that a solid, partially cured plastic layer can be formed on the core; the casting takes place in a pressure-free manner, and a pot life of approx. 45 seconds, preferably 5-15 and especially preferably from 7-8 seconds is planned.

There are provisions here for the reinforcement layer to be embedded without holes between the first and second plastic layers, in order to create a firm and permanent connection between the reinforcement layer and the plastic layers.

There are provisions in an embodiment of the invention for the at least one first plastic layer to be cured to a level of at least 90%, preferably 95%, with a special preference for 98%, before the reinforcement layer is wound onto it. A situation in which the reinforcement layer is not able to penetrate the first plastic layer down to the core is only achieved with the curing of the first plastic layer. The curing time of the materials that are used is influenced by the addition of reaction agents in connection with this, and time savings are made possible in this way during the production of the tubular bodies. Depending on the wall thickness and the degree of hardness, several first and second layers can be applied in connection with this to ensure that dynamic requirements of the tubular body are met. The thickness of the first plastic layer determines the position of the reinforcement layer within the wall range and can consequently be individually influenced by the subsequent winding on the cured plastic layer. There is the possibility, for instance, of applying a first plastic layer to start with and, after curing, applying a first reinforcement layer, preferably crosswise, and then applying at least one further curable plastic layer that can subsequently be wound up once again with a reinforcement layer, preferably crosswise. Finally, a second curable plastic layer is then applied to complete the tubular body. As a preference, the reinforcement layer can be embedded between the first and second plastic layers; the possibility additionally exists to not place the reinforcement layer precisely in the center, but to instead arrange it within the wall range at a certain distance from the outer diameter, wherein several reinforcement layers can likewise be arranged over the thickness to effect a long-term improvement in, for instance, the compression strength, the tensile strength or the resistance to wear and tear of the tubular body, in particular a tube. Furthermore, it is also conceivable for more than two reinforcement layers to be embedded in the manner described.

In special cases, the completed tubular body can be additionally coated with a protective layer after the last plastic layer is applied.

That can always be a requirement when the tubes that are manufactured have to be protected against external influences.

There are provisions in a further embodiment of the invention for the reinforcement layer to be comprised of individual fibers, corduroy or a fiber fabric that is wound on at an angle of 50° to 60°, preferably 55°. Both individual fibers and corduroy or a fiber fabric can be used for the reinforcement layer; a winding angle of 55° has turned out to be optimum because in the case of a winding angle greater than 55° a freely movable tube under internal pressure can only extend in the longitudinal direction with an internal diameter that stays the same, depending on the precision of the design, whereas in the case of a winding angle less than 55° the diameter of the tube will increase under pressure and the tube length will simultaneously be reduced.

If individual fibers are not a possibility, highly elastic warp cords made of nylon, polyester, a hybrid fabric or the like are used as a preference. Alternatively, steel and aramid filaments are also possibilities; they will then reduce the bending and energy absorption capabilities, though. The elasticity of the individual fibers or fiber fabric that is used brings about completely different behavior in connection with this, with the same bursting pressure, when there is dynamic stress. Tube diameters of 50 to 1200 mm are typically produced here with the aid of the method that is being presented.

There are further provisions, to increase the compression strength of the tubular bodies manufactured according to the method, for a ring-shaped or spiral-shaped stiffening element with spaced-apart sections to be applied to the last plastic layer, in particular a wearing layer, in the rotational molding process, or for a ring-shaped or spiral-shaped stiffening element with spaced-apart sections to be wound onto the last plastic layer, in particular a wearing layer. The compression strength of the tubular body is increased with the aid of the stiffening element; the stiffening elements are applied in the rotational molding process and can, in particular, be poured on or, as an alternative, ring-shaped or spiral-shaped stiffening elements can be wound on. Both the rings and the spiral-shaped arrangements are produced with appropriate spacings in connection with this because the entire surface of the tubular body has to be taken into consideration for the increase in compression strength. The spacing of the individual ring-shaped stiffening elements or spiral-shaped stiffening elements can be adapted here to the pressure conditions that are required.

The strength with respect to the internal pressure is substantially increased because of the stiffening elements; the additional possibility exists that a reinforcement material can in turn be wound around a wearing layer and the stiffening elements. To this end, plastic fibers with PU as the matrix are used as a preference. A cover layer made of PU can be applied externally as a protective layer.

A further embodiment of the method envisages here that prefabricated rings or spirals are used that are put on as stiffening elements in the course of the tube production. In the simplest case, ring-shaped or spiral-shaped structures made of impact-resistant hard PU are poured onto the wearing layer and form a firm bond with the wearing layer. The rotational molding process is suitable for this approach. When designing the geometry, care must be taken here to prevent the flexibility of the tube element from being obstructed to any great extent and yet to also achieve adequate stiffening of the cross-section.

Stiffer reinforcement elements are preferably used for larger diameters of more than 300 mm. These can be wound onto the wearing layer as a fiber composite material; carbon fibers and glass fibers, but also metal wire, are possibilities. The fibers can be comprised of fiber bundles made of continuous fibers. Bands in the form of a fabric can also be used, though. To join the stiffening elements with the last plastic layer, a matrix is provided that is comprised of a curable plastic mixture, for instance PU or epoxy resin. A preferred method of processing provides for the fibers or wires to first be wet down with the matrix and then wound onto the wearing layer in an electronically controlled manner; after the matrix is to be allowed to cure. In all the cases described, a strengthening layer for compression strength and a protective layer can be applied.

The tubular bodies, in particular tubes, are manufactured on a removable core and can be used further in diverse ways. Depending on the customer's desire, the possibility exists to deliver the tubes without a flange structure or to already provide a flange structure and create a firm connection to the tube.

A first variant provides for the fittings to be comprised of a flange disk with fastening holes and a flange neck. In this case, the tubular body is pushed onto the flange neck and connected to it, for instance via cold bonding. The fittings themselves can be made of steel or plastic, preferably polyurethane material. Alternatively, a fitting is used in accordance with a first design variant that is comprised of a flange disk with fastening holes and a clamping ring or lamella. Further variants of flange structures can likewise be used.

As an alternative, the possibility exists for the flange neck to be provided with at least one rib or one round ring, which either has a one-piece design or is subsequently welded on. There are provisions, to firmly connect the reinforcement layer to the flange structure, for the reinforcement layer to be passed over the ribs or a first fixed round ring and put around a second, movably mounted round ring on the flange neck; the two round rings will come to lie next to one another because of the tensile force that arises during winding. A tear-resistant connection is only created in this way via the reinforcement layer, which is additionally encased by the external plastic layer, when the tubular body with a flange structure is manufactured. The encasement is brought past the round rings in this case and ends in front of the flange disk on the flange neck or, if necessary, can be pulled through to the flange disk depending on the type of fastening. Before the reinforcement layer is put in place in the manner described, the fitting or the flange structure is pushed onto the first plastic layer; the flange neck can also be connected to the plastic layer via cold bonding in this case.

As a further alternative, the possibility exists to use a total of three round rings instead of two round rings. In this case, the reinforcement layer is passed over the ribs or a first fixed round ring and beneath a second movably mounted round ring, which can also be applied subsequently, for instance. The reinforcement layer is then put around a third movably mounted round ring and, following that, once again passed beneath the second movable round ring and over the fixed first round ring or, as the case may be, the rib that is formed, so all of the round rings also come to lie next to one another during winding in this case. Because of this, a tear-resistant connection is only created through the reinforcement layer, which can additionally be encased by an external plastic layer, during the production of the tubular body with a flange structure.

A special embodiment of the invention envisages that the round rings are designed to either be a full ring or a half ring and are connected to one another via one or two clamping sleeves. The second and third round rings, in particular the second round ring in the middle, can consequently be subsequently placed over the reinforcement layer before the winding process is continued. The round rings are clamped in connection with this via clamping sleeves that have a left-hand/right-hand thread on the end in each case so that the round rings are pulled together when the clamping sleeves are twisted.

As a further special alternative, there is the possibility of passing the reinforcement layer over the ribs or a first fixed round ring and subsequently passing it over a profiled ring and clamping it in place with the aid of a steel band; the reinforcement layer and the profiled ring are pressed onto the flange neck via the steel band. The profiled ring also comes to lie next to the round ring in this case. Instead of an axially movable round ring, a steel band with a profiled ring is used in this case; the profiled ring is wrapped by the reinforcement layer and can be pressed onto the flange neck with the aid of the steel band. As in the previous examples, the external plastic layer is passed in this case over the round ring, the profiled ring and the steel band, so the reinforcement layer is ultimately embedded in the plastic materials. The flange neck is once again connected to the lower plastic layer via cold bonding. A one-piece or two-piece fastening ring that are clamped in place with at least one clamping sleeve can be used as the fastening ring.

If several reinforcement layers are to be provided, each individual layer can be connected in the manner mentioned above to the fitting or to the flange structure.

A tubular body is produced via the method being presented here, in particular a tube for transporting abrasive materials comprised of at least one body wall, that distinguishes itself in that, when there are several reinforcement layers, each individual reinforcement layer is passed in each case over a rib or a round ring and fastened, or that the first and second plastic layers and the reinforcement layer are clamped between the flange disk and the clamping ring, or that the fittings with their flange neck are moved onto the first plastic layer and connected via cold bonding.

A special embodiment of the tubular body envisages here that the individual fibers, corduroy or a fiber fabric are wrapped at least crosswise to achieve an especially high level of tensile strength and compression strength.

A further embodiment envisages that at least one further plastic layer is applied to the first and/or the second plastic layer to obtain an especially thick wall or, if necessary, to embed further reinforcement layers.

A tubular body that is produced in this way distinguishes itself by the fact that the plastic layer is made of polyurethane that is applied for stabilization to a core or, as the case may be, the underlying layers made up of reinforcement layers or plastic layers for curing. The position in the wall range in which the reinforcement layer or, if necessary, several reinforcement layers will be arranged to ensure the required flexibility and stability of the tubular bodies can be individually established here via the selection of a specific thickness of the first plastic layer and further plastic layers.

A further embodiment of the invention envisages that the fittings will be comprised of a flange disk with fastening holes and a flange neck or of a flange disk with fastening holes and a clamping ring; the fittings can be made of steel or plastic, preferably polyurethane material. The tubular body can be equipped with the fittings that were described either at both ends or, if appropriate, with different fittings on each end so that several tubular bodies can be joined with one another to form a longer tube; different tube designs can also be used.

A special embodiment envisages that the fittings with their flange neck will be pushed onto the outermost plastic layer and cold bonded, or that the first and second plastic layers and the reinforcement layers will be clamped between a steel disk and a clamping ring.

Alternatively, the possibility exists that the fittings or, as the case may be, the flange structure will be provided with at least one fixed rib or a round ring, and the reinforcement layer will be passed over the rib or the round ring and wrapped around a second round ring that is mounted so as to be axially movable; the round ring will get into direct contact with the fixed round ring due to the winding process to create a fixed connection in that way between the tubular body and the flange structure.

Alternatively, there is the possibility of using a total of three rings; of those, a first round ring is firmly connected to the flange structure and two further round rings are movably held on the flange neck. The reinforcement layer is passed over the first fixed round ring here, wound past the second round ring around the third round ring and, after that, brought back past the second round ring again, so the round rings are pulled against the first round ring via the tensile forces that arise when the reinforcement layer is wound. The round rings can involve open rings or, if appropriate, two ring halves that are clamped with the aid of a clamping sleeve. The second round ring can be subsequently put on this and clamped in connection with this.

As a further alternative, the possibility exists to use a profiled ring with a steel band instead of a second movable round ring; the reinforcement layer is looped around the profiled ring, and the reinforcement layer and the profiled ring are pressed on the flange neck with the aid of the steel band. In this case, the steel band can have a one-piece or two-piece design and be clamped with at least one clamping sleeve. Instead of a clamping sleeve, other means of clamping, for instance a turnbuckle, can be used.

The tubular bodies that are produced in this way can have a diameter of 50-≥1200 mm.

The instant invention distinguishes itself by the fact that a quick manufacturing process can be used that ensures that the required reinforcing-fiber layers can be arranged in a position that meets the requirements with regard to compression strength and tensile strength. There are provisions here for the reinforcement layer to first be wrapped on after the curing of at least a first plastic layer; the reinforcement layer will preferably be wrapped on crosswise so that at least a second plastic layer can subsequently be applied. The possibility likewise exists, by repeatedly applying plastic layers, to provide several reinforcement layers and to embed them within the plastic layers. Because of the use of polyurethane materials, a substantially longer service life of the tubes can be obtained here with respect to customary vulcanized rubber tubes. The embodiment with fittings on the ends can, on top of that, have a relatively simple design, because the fittings can be directly connected to the reinforcing-fiber layer, for instance by securing them with a second movable round ring; there is additionally cold bonding among the fibers, fittings and plastic layers, so the fastening of the fittings likewise ensures a longer service life for the tubular body. The customary cut resistance and abrasion resistance of rubber tubes can be increased two to three times in connection with this. This is not so much a matter of abrasion resistance here, but instead erosion resistance of the inside of the tube due to the abrasive materials to be conveyed. The rebound resilience of the interior material, which is very high due to the polyurethane materials that are used and which can be individually adapted, is crucial. Because of the use of plastic coatings and the winding of the fibers or of the fabric after the curing of the first plastic layer, it is ensured here that the reinforcement layer cannot penetrate into the first plastic layer and can consequently be embedded in a selected position within the wall range.

The invention will be explained once again below with the aid of the figures.

DETAILED DESCRIPTION OF THE PREFERRED EMBODIMENTS

Figure 1:
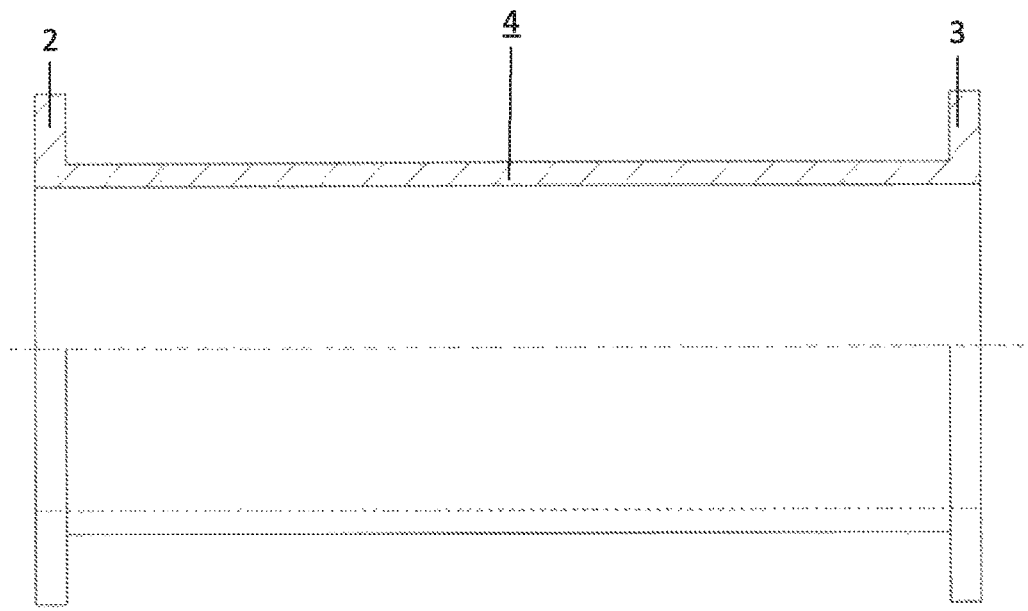
FIG. 1 shows a pressure tube manufactured according to the method as per the invention in a partially sectioned side view.

FIG. 1 shows, in a partially sectioned partial view, a tube section 1 comprised of a body 4 and fittings on the ends 2, 3. This type of tubular bodies 1 with an external surface is preferably used as a pressure tube and can have nominal diameters of 50 mm to >1200 mm; a fixed connection is made with the fittings 2, 3 so that several of these tubular bodies 4 can be connected with one another to form a longer tube. Even individual pieces of the tubular body 4 can have a length of several meters here.

Figure 2:
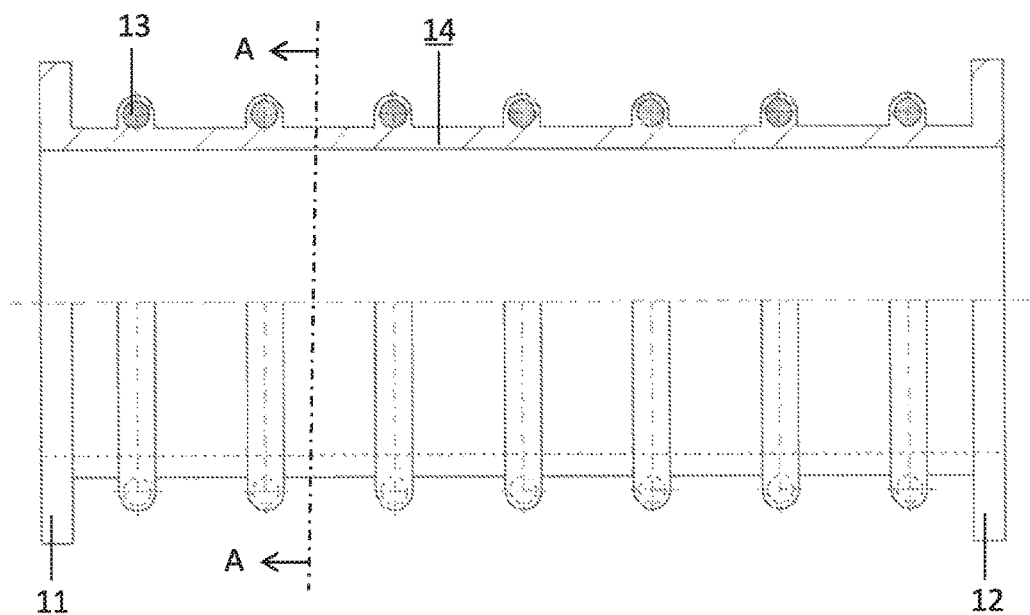
FIG. 2 shows a suction tube manufactured according to the method as per the invention in a partially sectioned side view.

FIG. 2 shows, in a partially sectioned view, a tube section 9 comprised of a body 10 that is used as a suction tube. The upper half of the body 10 is shown in a sectional view; the tubular body 10 is also equipped in this case with end fittings 11, 12 that are firmly connected to the body 10. This embodiment is jacketed by steel rings or external, rotationally molded polyurethane spirals with a high level of hardness to obtain greater strength and wall stability.

Both of the examples show possible tubular bodies 1, 10 that can be manufactured according to the method as per the invention.

Figure 3:
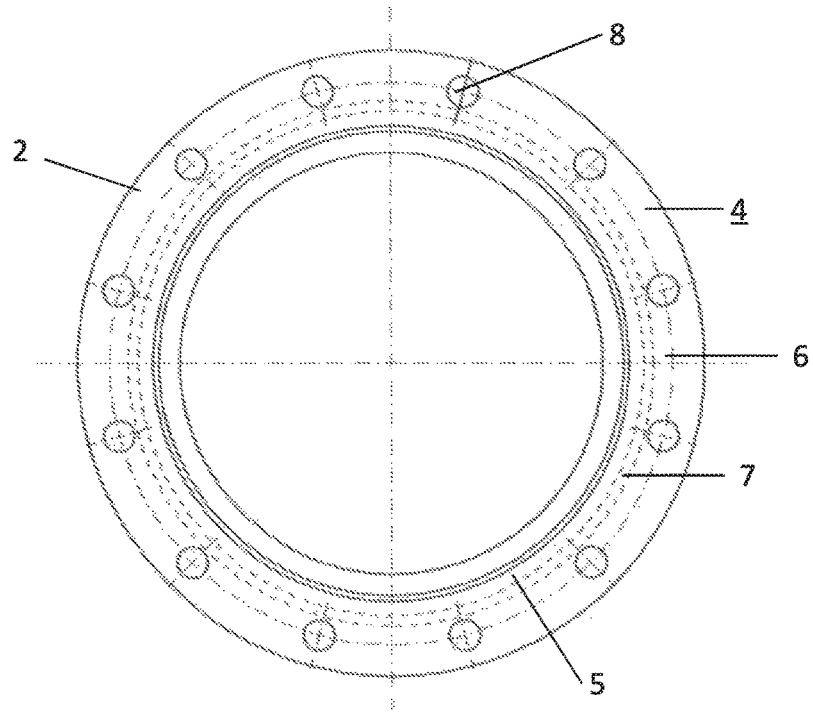
FIG. 3 shows the pressure tube in accordance with FIG. 1 in a top view.

FIG. 3 shows, in a top view, the tubular body 4 known from FIG. 1 with a fitting 2. The layered structure of the tubular body 4, which is comprised of an inner plastic layer 5 and an outer plastic layer 6, as well as a central layer in the form of a reinforcement layer 7, can be seen in this view. Several fastening holes 8 are provided for screw connections.

Figure 4:
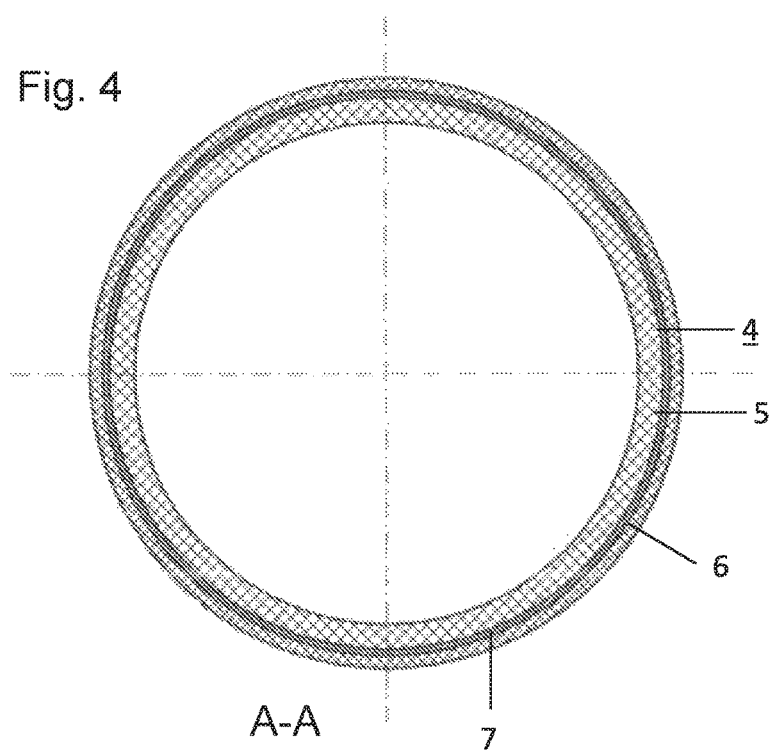
FIG. 4 shows the pressure tube in accordance with FIG. 1 in a sectional drawing.

FIG. 4 shows, in a sectional view, the tubular body 4 with the inner plastic layer 5, the outer plastic layer 6 and the reinforcement layer 7. An embodiment is involved in the example that is shown that can be modified in accordance with the requirements that are placed on it; for instance, the inner plastic layer 5 can be comprised of several individual layers and the outer plastic layer 6 can likewise be comprised of several individual layers. Furthermore, the reinforcement layer 7 can be arranged in a multi-part structure with radial spacings, preferably between the individual or multiple plastic layers 5, 6.

Figure 5A:
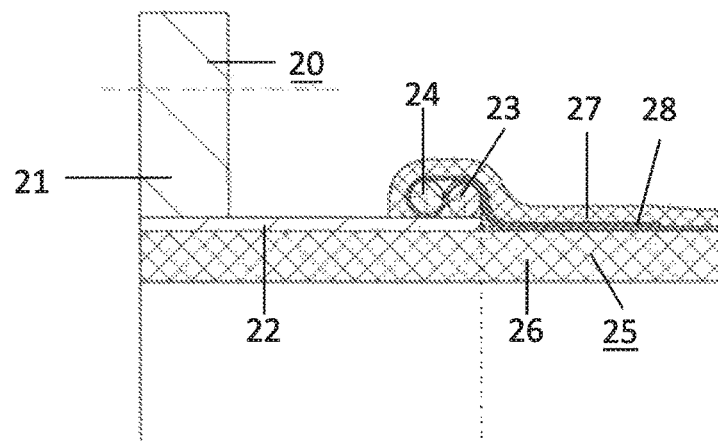
FIG. 5A shows a connection of the tubular body to a flange in a schematic view.

FIG. 5A shows, in a sectional view, the attachment of a suction or pressure hose to a fitting 20. The fitting 20 is comprised of a flange disk 21 and a flange neck 22, which are either manufactured in one piece or firmly connected to each other. A round ring 23 is fastened to, preferably welded onto, the flange neck; a second round ring 24 is, on the other hand, loosely arranged in a movable fashion on the flange neck 22 between the flange disk 21 and the round ring 23. A tube section 25 comprised of an inner plastic layer 26, an outer plastic layer 27 and a reinforcement layer 28 is connected via the reinforcement layer 28 to the fitting 20. The connection is effected in such a way that the reinforcement layer 28 is passed over the fixed round ring 23 and wrapped around the loose round ring 24. The round ring 24 comes to lie next to the round ring 23 here because of the winding process and is subsequently completely embedded via the application of the outer plastic layer 27. The embedding with the outer plastic layer can, if necessary, be carried on to the flange disk in connection with this. The inner plastic layer 26 extends, on the other hand, to the flange disk 21; it is preferably pushed onto the completed first plastic layer 26 and connected via cold bonding. After that, the reinforcement layer 28 is put in place and the second plastic layer 27 is subsequently applied.

Figure 5B:
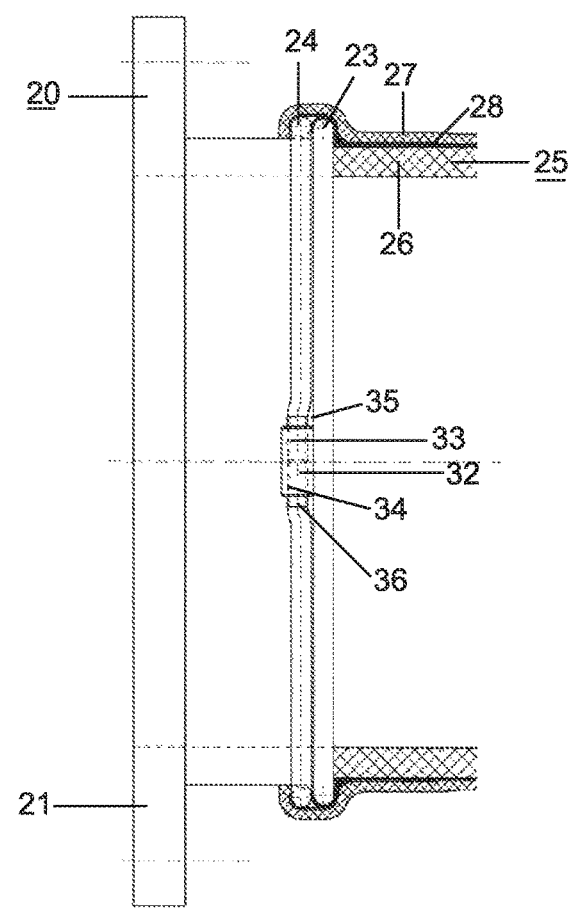
FIG. 5B shows a connection of the tubular body to a flange in a top view.

As is especially evident from FIG. 5B, the round ring 24 involves an open ring that is connected and that can be clamped with the aid of a clamping sleeve 32. To this end, the clamping sleeve 32 has a threaded hole 33, 34, designed as a left-hand/right-hand thread, in each of its faces. The retaining ring 24 with its threaded ends 35, 36 can consequently be screwed into the sleeve and clamped via a rotary movement. The reinforcement layer 28 can therefore be fastened as follows. The reinforcement layer 28 is first passed over the first fixed round ring 23 in the direction of the flange disk 21; after that, the retaining ring 24 is put on and the clamping process takes place so that the reinforcement layer 28 can be subsequently folded back over the loose round ring 24, and it can come to rest on the reinforcement layer 28 that has already been wound. Moreover, the possibility exists after that to pour a further plastic layer 27 over both the first plastic layer 26 and the reinforcement layer 28.

Figure 6:
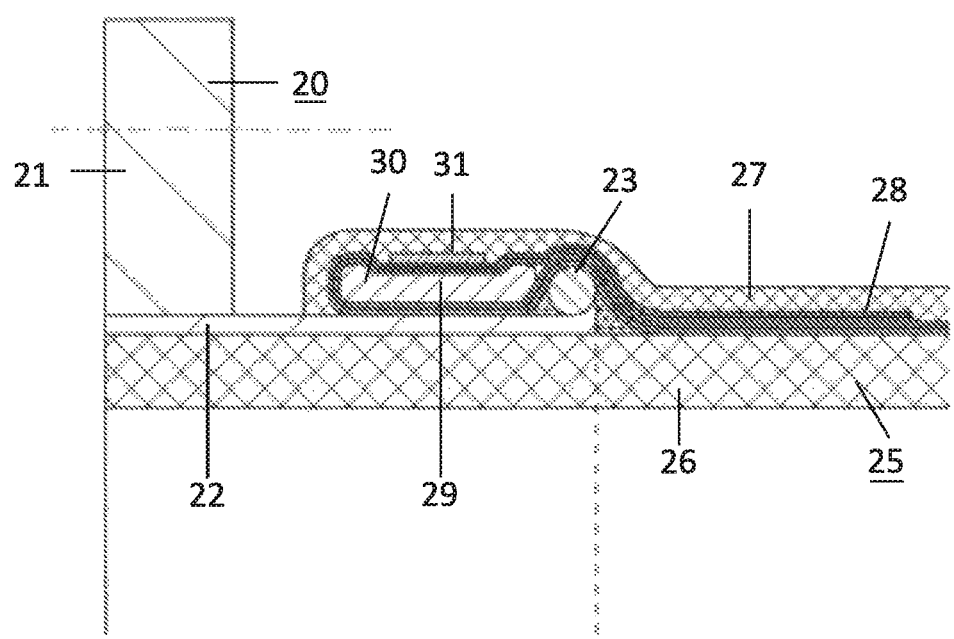
FIG. 6 shows a further possibility for connecting the tube as per the invention to a flange in a schematic view.

FIG. 6 shows, in a sectional view, another connection between a fitting 20, with a flange disk 21 and a flange neck 22, and a tube section 25. As in the previous example, the fitting 20 is pushed onto the partially prepared tube and, in fact, onto the first plastic layer 26, and the reinforcement layer 28 is passed once again over the round ring 23 and, after that, wound over a profiled ring 29 placed around the flange neck 22 and led back to the tube section 25. The profiled ring 29 has a slight recess that can have a trapezoidal design or, if appropriate, a U-shaped design. The wound reinforcement layer 28 comes to rest at first in the recess 30 and is additionally held in place by a steel band 31. The steel band 31 is passed around the wound reinforcement layer 28 and clamped in connection with this, so the reinforcement layer 28 and the profiled ring 29 are clamped onto the flange neck 22. The profiled ring 29 is brought up to the round ring 23 here, so the reinforcement layer 28 is likewise located between the round ring 23 and the profiled ring 29. A secure attachment of the reinforcement layer 28 on the fitting 20 is made possible here with the aid of the profiled ring 29 and the steel band 31, so a reliable hold is ensured even in the case of axially acting forces on the tube section 25. The second, outer plastic layer 27 is applied over the reinforcement layer 28, the steel band 31 and the profiled ring 29. The steel band 31 can likewise be comprised of two halves so that clamping can take place with the aid of at least one or, as the case may be, two clamping sleeves or a turnbuckle.

Figure 7A:
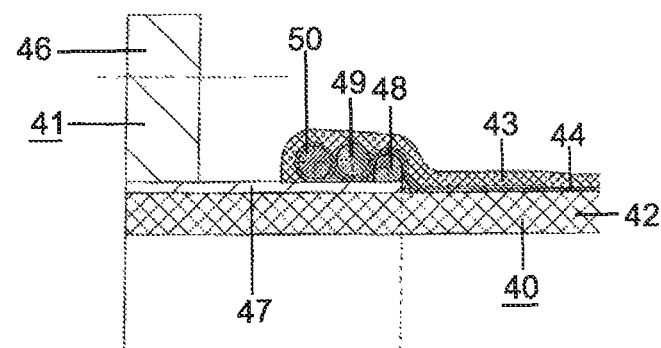
FIG. 7A shows a further design variant for attachment with a flange in a sectional side view.
Figure 7B:
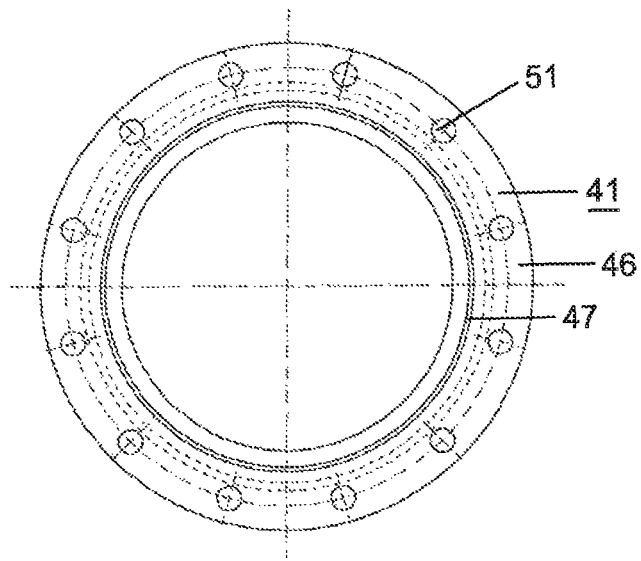
FIG. 7B shows a further design variant for attachment with a flange in a top view.
Figure 7C:
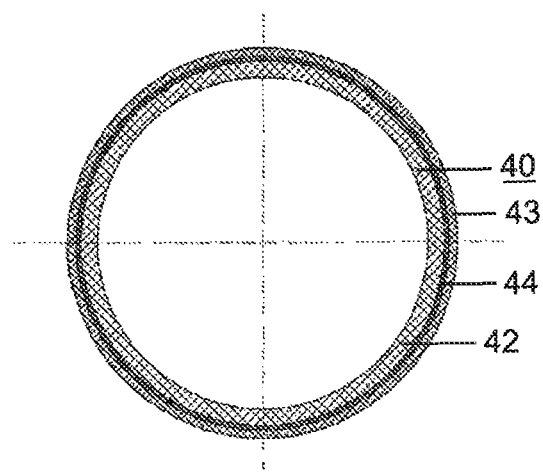
FIG. 7C shows a further design variant for attachment with a flange in a sectional top view.

FIGS. 7A, 7B and 7C show a further example of the connection of a fitting 41 to a tube section 40 in three views and, in fact, in a sectional side view, a top view and a sectional top view. The upper longitudinal section shows the tube section 40 with the fitting 41. The tube section 40 is comprised of a first plastic layer 42, a second outer plastic layer 43 and a reinforcement layer 44. The fitting 41 is comprised of a flange disk 46 and a flange neck 47; the flange neck 47 is pushed onto the first plastic layer, which has already been completed, and is cold bonded if appropriate. A round ring 48 is fastened, for instance welded, at the end to the flange neck 47. A second round ring 49 and a third round ring 50 are located between the flange disk 46 and the round ring 48. The round rings 49, 50 are arranged so as to be axially movable. The reinforcement layer 44 wound onto the first plastic layer 42 is passed over the first round ring, passed through under the second round ring 49, wound around the third round ring 50 and passed once again under the second round ring 49 and over the fixed round ring 48, and led back into the plane of the reinforcement layer 44. Because of this structure, the forces that arise when there are tensile stresses on the tube section 40 are directly introduced into the fitting 41 via the reinforcement layer 44.

Figure 8:
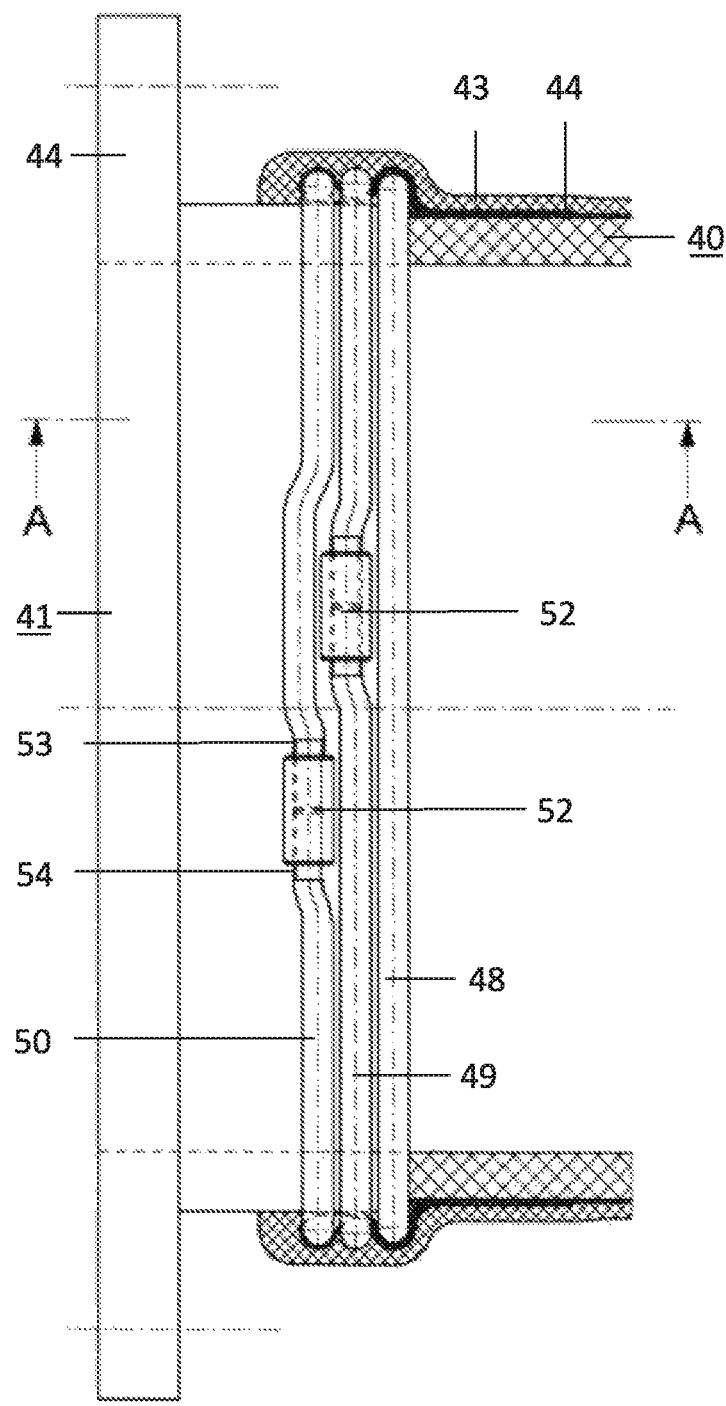
FIG. 8 shows a further design variant in accordance with FIG. 7 in a top view.

The two loose round rings 49, 50 can be comprised of one open or two divided round rings. They are fixed in place and clamped on the flange neck 47 with a clamping sleeve, as can be seen in FIG. 8. A top view onto the fitting 41 is shown in the center view and, in fact, with the flange disk 46 and the flange neck 47. The flange disk 46 is equipped with several holes 51 distributed over the circumference, so a screw connection with further fittings is enabled. The structure of the tube section 40 is only suggested by the dashed circular rings in this case.

The tube section 40, which is comprised of an inner plastic layer 42, a reinforcement layer 44 and an outer plastic layer 43, can be seen in the lower partial figure.

FIG. 8 shows, in a top view, the tube section 40 known from FIG. 7 with the fitting 41; the fixed round ring 48 and the two loose round rings 49, 50 can be seen in this view. The loose round rings 49, 50 are closed up and clamped via a clamping sleeve 52 in each case. Depending on whether a round ring 49, 50 is used or, as the case may be, two half round rings 49, 50, either one clamping sleeve 52 per round ring or, if applicable, two clamping sleeves 52 are to be used. The clamping sleeves 52 have a right-hand/left-hand thread 53, 54 so that the round rings 49, 50 can be loosened or clamping can take place by rotating the clamping sleeve.

The possibility exists here because of the use of divided round rings 49, 50 to subsequently place them around the flange neck 47.

To fasten the fitting 41 to the tube section 40, the fitting 41 with its flange neck 47 is first pushed onto the first plastic layer here, or cold bonded if appropriate, and the reinforcement layer 44 is subsequently wound on; the reinforcement layer is passed over the first fixed round ring 48 in the direction of the flange disk 46. After that, the third round ring 50 can be placed on this and, after the reinforcement layer 44 has been brought back, the round ring 49 so that the reinforcement layer 43 is finally brought back over the fixed round ring 48 into the plane of the tube section 40. The round rings 50 are clamped in connection with this before the reinforcement layer 44 is brought back, whereas the second round ring 49 is clamped after the pullback; subsequent assembly does not pose any problems due to the open round rings or half-rings.

Figure 9:
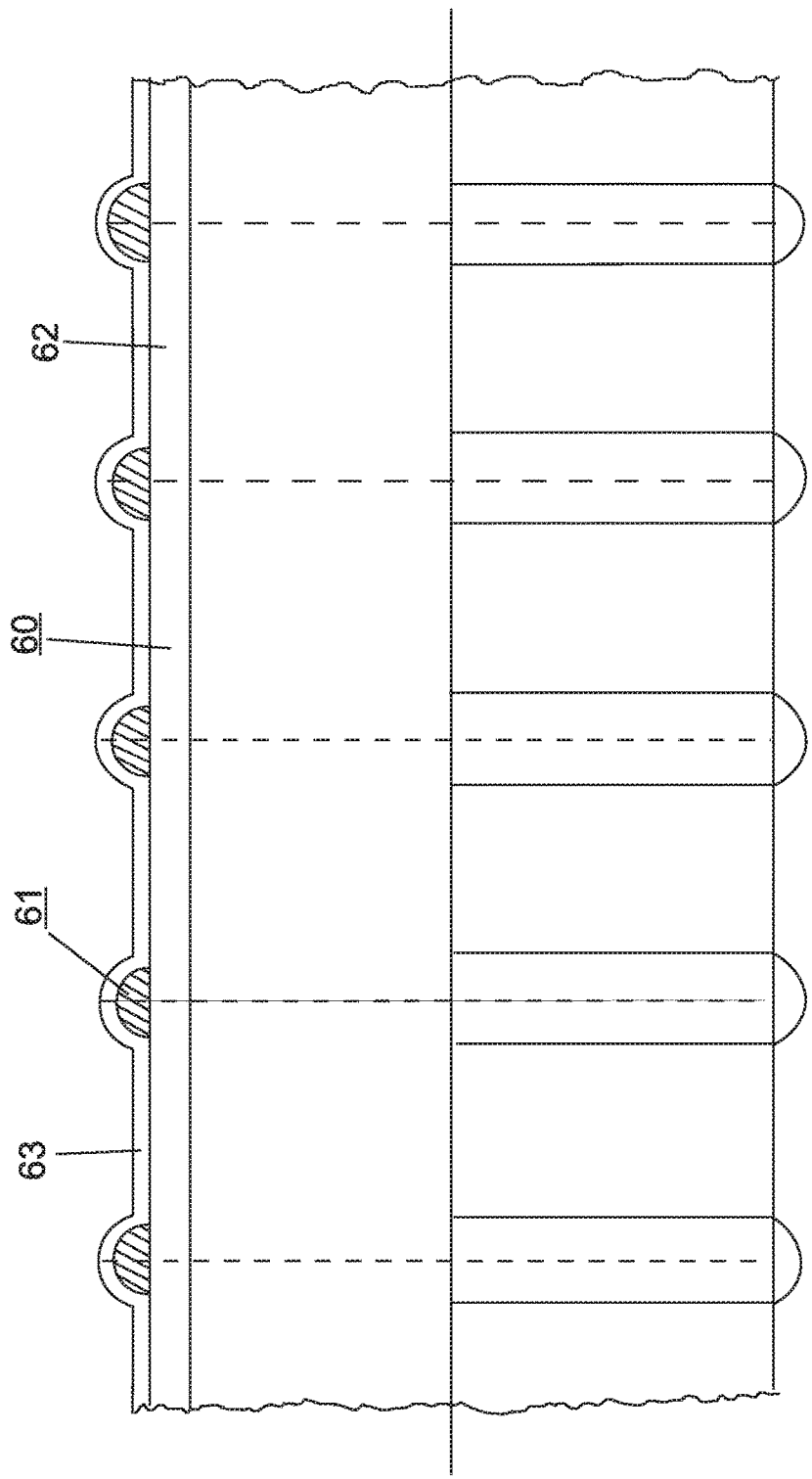
FIG. 9 shows a pressure tube with ring-shaped stiffening elements in a partially sectioned partial view and FIG. 10 shows a pressure tube with spiral-shaped stiffening elements in a partially sectioned partial view.

FIG. 9 shows, in a partially sectioned partial view, a pressure tube 60. The pressure tube 60 corresponds in terms of its structure to the tube sections previously described; it is additionally jacketed by ring-shaped stiffening elements 61 on the outer circumferences. The stiffening elements 61 are comprised, for example, of hard PU or a composite material and are either sheathed with a wearing layer or a cover layer 62. The possibility exists here for the stiffening elements 61 to be applied in a rotational molding process to the cover layer 62 or, if the stiffening elements 61 are comprised of a fiber composite or a wire layer as examples, wound onto the cover layer 62. A strengthening layer or cover layer 63 is applied over the stiffening elements 61, so the pressure tube 60 is completely covered by the cover layer 63. The spacing of the individual stiffening elements 61, which are preferably arranged at equidistant intervals, can be determined in accordance with the requirements for the pressure tube 60 here. The thickness of the stiffening elements 61 can likewise be determined.

Figure 10:
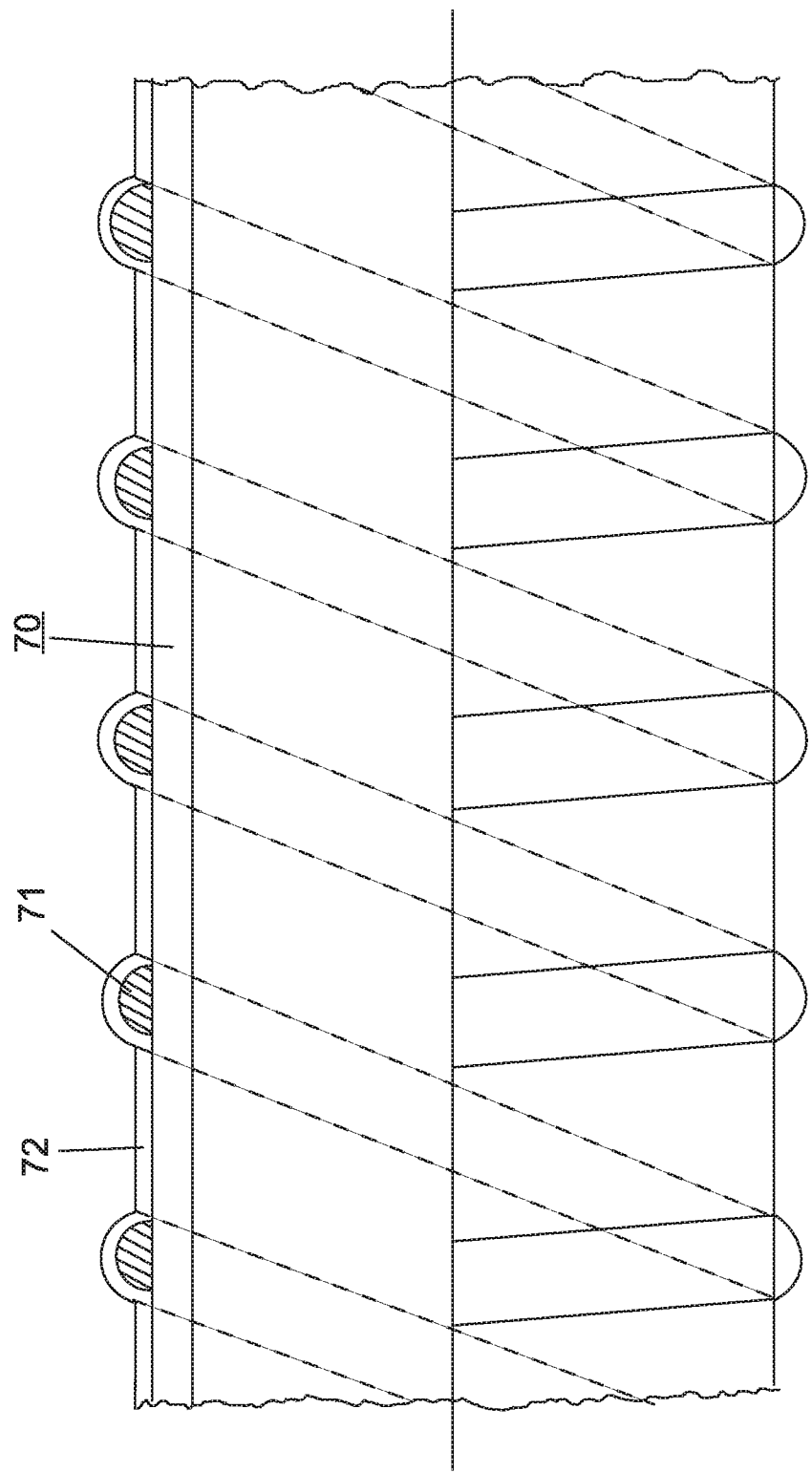

FIG. 10 shows, in a partially sectioned partial view, a pressure tube 70 that is jacketed with spiral-shaped stiffening elements 71. The stiffening elements 71 can likewise be comprised of a hard PU or composite material and are applied in a rotational molding process or wound on. A protective layer 72 that covers the entire pressure tube 70 is in turn applied to the stiffening elements 71. The spacing of the spiral-shaped stiffening elements 71 and their thickness can be adapted to the requirements for compression strength.

LIST OF REFERENCE NUMERALS

1 Tube section
2 Fitting
3 Fitting
4 Body
5 Plastic layer
6 Plastic layer
7 Reinforcement layer
8 Fastening holes
9 Tube section
10 Body
11 Fitting
12 Fitting
13 Steel ring
20 Fitting
21 Flange disk
22 Flange neck
23 Round ring
24 Round ring
25 Tube section
26 Plastic layer
27 Plastic layer
28 Reinforcement layer
29 Profiled ring
30 Recess
31 Steel band
40 Tube section
41 Fitting
42 Plastic layer
43 Plastic layer
44 Reinforcement layer
46 Flange disk
47 Flange neck
48 Round ring
49 Round ring
50 Round ring
51 Holes
52 Clamping sleeve
53 Right-hand thread
54 Left-hand thread
60 Pressure tube
61 Ring-shaped stiffening element
62 Cover layer
63 Cover layer
63 Strengthening layer
70 Pressure tube
71 Spiral-shaped stiffening element
72 Protective layer

The invention claimed is:

1. Method for production of a tubular body (4) made up of least one body wall, comprising the following process steps:
    application of at least one first curable plastic layer (5, 26, 42) made of reactive polyurethane materials to a core via a rotational molding process,
    curing the at least one first curable plastic layer (5, 26, 42),
    winding at least one reinforcement layer (7, 28, 44) onto the at least one first curable plastic layer (5, 26, 42),
    application of at least one second curable plastic layer (6, 27, 43) to the reinforcement layer, wherein the reinforcement layer is embedded without holes between the at least one first curable plastic layer and the at least one second curable plastic layer, and
    removal of the core after completion of the tubular body (4, 40).

2. Method according to claim 1,
characterized in that
    at least 90% of the at least one first curable plastic layer (5, 26, 42) is cured before the reinforcement layer (7, 28, 44) is wound on, or that at least 95% of the at least one first curable plastic layer (5, 26, 42) is cured before the reinforcement layer (7, 25, 44) is wound on, or that at least 98% of the at least one first curable plastic layer (5, 26, 42) is cured before the reinforcement layer (7, 25, 44) is wound on.

3. Method according to claim 1,
characterized in that
at least one third plastic layer is applied to the at least one first curable plastic layer (5, 26, 42) and/or the at least one second curable plastic layer (6, 27, 43).

4. Method according to claim 1,
characterized in that
second reinforcement layer is embedded between the at least one second curable plastic layer (6, 27, 43) and a third plastic layer.

5. Method according to claim 1,
characterized in that
at least one further reinforcement layer (7, 28, 44) is wound onto the reinforcement layer (7, 28, 44) or that a third plastic layer (7, 28, 44) is first wound onto the reinforcement layer (7, 28, 44) and then at least one further reinforcement layer (7, 28, 44).

6. Method according to claim 1,
characterized in that
the at least one second curable plastic layer (6, 27, 43) is additionally coated with a protective layer as a wearing layer.

7. Method according to claim 1,
characterized in that
a ring-shaped stiffening element (61) or a spiral-shaped stiffening element (71) with spaced-apart sections is applied in the rotational molding process to the at least one second curable plastic layer (6, 27, 43), or that a ring-shaped stiffening element (61) or a spiral-shaped stiffening element (71) with spaced-apart sections is wound onto the at least one second curable plastic layer (6, 27, 43).

8. Method according to claim 1,
characterized in that
stiffening elements (61, 71) made of hard polyurethane are poured onto a wearing layer, or that stiffening elements (61, 72) made of fiber composite materials, glass fibers or metal wire are wound onto a wearing layer.

9. Method according to claim 1,
characterized in that
fiber composite materials comprised of fiber bundles, of continuous fibers or of bands in the form of a fabric are wound onto a wearing layer, wherein a matrix for the fiber composite materials is made of impact-resistant, curable plastic mixtures.

10. Method according to claim 1,
characterized in that
fiber composite materials along with a matrix comprised of a curable plastic mixture are wet down before winding and hardened on the at least one second curable plastic layer (6, 27, 43).

11. Method according to claim 1,
characterized in that
the at least one first curable plastic layer (5, 26, 42) and/or the at least one second curable plastic layer (6, 26, 43) is comprised of a 2k or multi-component polyurethane system.

12. Method according to claim 1,
characterized in that
the reinforcement layer (7, 28, 44) is comprised of individual fibers, corduroy or a fiber fabric that is wound on at an angle of 50° to 60°, and/or that the individual fibers, the corduroy or the fiber fabric is wound on crosswise at least once.

13. Method according to claim 1,
characterized in that
the pot life of the at least one first curable plastic layer and the at least one second curable plastic layer is approximately 45 seconds or 5 to 15 seconds or 7 to 8 seconds.

14. Method according to claim 1,
characterized in that
the tubular body (4) is provided with fittings (2, 3, 11, 12, 20, 41) on at least one end, wherein the fittings (2, 3, 11, 12, 20, 41) are comprised of a flange disk (21, 46) with fastening holes (8, 51) and a flange neck (22, 47) or are comprised of a flange disk (21, 46) with fastening holes (8, 51) and a clamping ring made of steel or a plastic.

15. Method according to claim 14,
characterized in that
the flange neck (22, 47) is provided with at least one rib or a round ring (23, 48) that is firmly connected to the flange neck (22, 47), and at least one axially movable round ring (24, 49, 50) is mounted on the flange neck (22, 47).

16. Method according to claim 1,
characterized in that
the reinforcement layer (7, 28, 44) is passed over ribs or a first fixed round ring (23, 48) and put around a second, movably mounted round ring (24, 49) on a flange neck (22, 47), wherein the first fixed round ring and the second, movably mounted round ring come to lie next to one another, or that the reinforcement layer (7, 28, 44) is passed over ribs or a first fixed round ring (23, 48) and subsequently put around a profiled ring (29), and the reinforcement layer (7, 28, 44) and the profiled ring (29) are pressed via a steel band (31) onto a flange neck (22, 47), wherein the profiled ring (29) comes to lie next to the first fixed round ring (23, 48), and/or that the reinforcement layer (7, 28, 44) is passed over ribs or a first fixed round ring (48) and comes to lie beneath a second, movably mounted round ring (49), is passed around a third round ring (50) and is brought back under the second, movably mounted round ring (49) and over the first fixed round ring (48) into the plane of the reinforcement layer (44).

17. Method according to claim 1,
characterized in that
when there are several reinforcement layers (7, 28, 44), each individual reinforcement layer (7, 28, 44) is passed over a rib or a round ring (23, 48) and fastened in each case, or that the at least one first curable plastic layer (5, 26, 42) and the at least one second curable plastic layer (6, 27, 43) and each individual reinforcement layer (7, 28, 44) are clamped between a flange disk (21) and a clamping ring, or that fittings (2, 3, 11, 12, 20, 41) with flange necks (22, 47) are pushed onto the at least one first curable plastic layer (5, 26, 42) and connected via cold bonding.

* * * * *